US012055227B2

(12) United States Patent
Méri et al.

(10) Patent No.: US 12,055,227 B2
(45) Date of Patent: Aug. 6, 2024

(54) FLAPPER CHECK VALVE

(71) Applicant: Hamilton Sundstrand Corporation, Charlotte, NC (US)

(72) Inventors: András Méri, Wroclaw (PL); Bartosz Solarz, Wroclaw (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/726,767

(22) Filed: Apr. 22, 2022

(65) Prior Publication Data
US 2022/0341501 A1    Oct. 27, 2022

(30) Foreign Application Priority Data
Apr. 27, 2021 (EP) ..................... 21461535

(51) Int. Cl.
F16K 15/03 (2006.01)
(52) U.S. Cl.
CPC ................. F16K 15/038 (2013.01)
(58) Field of Classification Search
CPC .................................... F16K 15/038
See application file for complete search history.

(56) References Cited

U.S. PATENT DOCUMENTS

| 2,877,792 | A | * | 3/1959 | Tybus | F16K 15/038 137/527 |
| 3,074,427 | A | * | 1/1963 | Wheeler, Jr. | F16K 15/038 137/454.2 |
| 3,538,946 | A | * | 11/1970 | Hilsheimer | F16K 15/038 137/512.1 |
| 3,965,926 | A | * | 6/1976 | Buckner | F16K 15/038 137/512.1 |
| 4,079,751 | A | | 3/1978 | Partridge et al. | |
| 4,230,148 | A | | 10/1980 | Ogle, Jr. | |
| 4,257,444 | A | * | 3/1981 | Ogle, Jr. | F16K 1/223 137/454.2 |
| 4,774,981 | A | * | 10/1988 | Mizusawa | F16K 15/038 137/515 |
| 4,867,199 | A | * | 9/1989 | Marx | F16K 15/038 137/512.1 |

(Continued)

OTHER PUBLICATIONS

European Search Report for Application No. 21461535.3, mailed Oct. 14, 2021, 12 pages.

Primary Examiner — Daphne M Barry
Assistant Examiner — Frederick D Soski
(74) Attorney, Agent, or Firm — CANTOR COLBURN LLP

(57) ABSTRACT

A check valve includes a housing defining a pair of valve openings, a pair of flappers pivotably mounted to a pin and such that they are configured to rotate relative to the housing between an open position in which they permit fluid flow through the valve openings and a closed position in which they prevent fluid flow through the valve openings, and an element configured to stop and hold the flappers in the open position. A cavity is formed between the pair of flappers and stop element when the flappers are in the open position. Each of the flappers comprise one or more contact surfaces configured to contact the stop element when in the open position. The stop element has stop surfaces with stationary contact areas configured to oppose and abut the flapper contact surfaces when the flappers are in the open position.

11 Claims, 4 Drawing Sheets

(56) References Cited

U.S. PATENT DOCUMENTS

| | | | | |
|---|---|---|---|---|
| 4,896,695 A * | 1/1990 | Pysh | F16K 15/038 | 137/527 |
| 4,977,926 A * | 12/1990 | Hocking | F16K 15/038 | 137/527 |
| 5,246,032 A | 9/1993 | Muddiman | | |
| 5,301,709 A * | 4/1994 | Gasaway | F16K 15/038 | 137/512.1 |
| 5,381,821 A * | 1/1995 | Muddiman | F16K 15/038 | 137/454.2 |
| 5,392,810 A * | 2/1995 | Cooper | F16K 15/038 | 137/527 |
| 7,325,569 B2 * | 2/2008 | Denike | F16K 15/038 | 137/512.1 |
| 7,493,770 B2 * | 2/2009 | Christianson | F02C 6/08 | 60/785 |
| 7,568,498 B2 | 8/2009 | Denike et al. | | |
| 7,779,859 B2 * | 8/2010 | Denike | B64D 13/02 | 16/86 A |
| 9,206,913 B2 * | 12/2015 | Rankin | F16K 15/036 | |
| 9,464,724 B2 | 10/2016 | Kamp et al. | | |
| 9,476,515 B2 | 10/2016 | Kamp et al. | | |
| 9,518,668 B2 * | 12/2016 | Barone | F16K 15/038 | |
| 9,803,761 B1 | 10/2017 | Olszowy | | |
| 9,890,864 B2 * | 2/2018 | Minta | F16K 15/038 | |
| 10,072,767 B2 * | 9/2018 | Reszewicz | F16K 15/03 | |
| 10,167,974 B2 * | 1/2019 | Minta | F16K 47/00 | |
| 10,174,850 B2 | 1/2019 | Solarz | | |
| 10,539,245 B2 * | 1/2020 | Reszewicz | F16K 15/038 | |
| 10,612,690 B2 * | 4/2020 | Lesniewski | F16K 15/038 | |
| 10,648,581 B2 * | 5/2020 | Jaśkiewicz | F16K 27/0209 | |
| 10,859,174 B2 | 12/2020 | Jaskiewicz et al. | | |
| 2008/0023080 A1 * | 1/2008 | McGonigle | F16K 15/038 | 137/512.15 |
| 2008/0053536 A1 * | 3/2008 | Denike | B64D 13/02 | 137/512.1 |
| 2008/0053537 A1 * | 3/2008 | McGonigle | F16K 1/22 | 137/554 |
| 2008/0072973 A1 * | 3/2008 | McGonigle | B64D 13/02 | 137/512.1 |
| 2008/0072974 A1 * | 3/2008 | Denike | F16K 15/038 | 137/527 |
| 2008/0078458 A1 * | 4/2008 | Denike | B64D 13/02 | 137/512.1 |
| 2008/0078459 A1 * | 4/2008 | Warriner | F16K 15/038 | 137/512.1 |
| 2009/0032119 A1 * | 2/2009 | Dulay | F16K 15/038 | 137/527 |
| 2009/0056818 A1 * | 3/2009 | McGonigle | F16K 15/038 | 137/527 |
| 2010/0282340 A1 * | 11/2010 | Dehais | F16K 15/038 | 137/511 |
| 2013/0019966 A1 * | 1/2013 | Hawa | F16K 15/03 | 137/511 |
| 2013/0340862 A1 | 12/2013 | Kamp et al. | | |
| 2014/0041739 A1 * | 2/2014 | Barone | F16K 27/0227 | 137/516.25 |
| 2014/0202562 A1 * | 7/2014 | Kamp | F16K 15/038 | 137/527 |
| 2015/0068612 A1 * | 3/2015 | Barone | F16K 15/038 | 137/512.1 |
| 2015/0240960 A1 * | 8/2015 | Kamp | F16K 15/038 | 137/856 |
| 2015/0267824 A1 * | 9/2015 | Feng | F16K 47/045 | 137/12 |
| 2016/0010757 A1 * | 1/2016 | Barone | F16K 15/038 | 137/12 |
| 2016/0018012 A1 * | 1/2016 | Kamp | F16K 15/038 | 16/386 |
| 2016/0040792 A1 * | 2/2016 | Kamp | F16K 15/038 | 137/15.19 |
| 2016/0040793 A1 * | 2/2016 | Barone | F16K 15/038 | 137/527 |
| 2016/0040794 A1 * | 2/2016 | Minta | F16K 15/035 | 137/527 |
| 2016/0040799 A1 * | 2/2016 | Kamp | F16K 15/03 | 137/15.19 |
| 2016/0146361 A1 * | 5/2016 | Solarz | F16K 15/038 | 137/527 |
| 2016/0146362 A1 * | 5/2016 | Solarz | F16K 15/03 | 137/527 |
| 2017/0167620 A1 | 6/2017 | Minta | | |
| 2017/0167632 A1 * | 6/2017 | Fiedziuk | F16K 15/038 | |
| 2017/0204981 A1 * | 7/2017 | Olejak | F16K 47/045 | |
| 2017/0204984 A1 * | 7/2017 | Minta | F16K 47/00 | |
| 2017/0268696 A1 * | 9/2017 | Lesniewski | F16K 47/023 | |
| 2017/0356555 A1 * | 12/2017 | Solarz | F16K 27/0209 | |
| 2017/0356561 A1 * | 12/2017 | Reszewicz | F16K 27/0209 | |
| 2018/0023714 A1 * | 1/2018 | Reszewicz | F16K 15/038 | 137/512 |
| 2018/0355985 A1 * | 12/2018 | Reszewicz | F16K 15/038 | |
| 2019/0186645 A1 | 6/2019 | Jaskiewicz | | |
| 2019/0211939 A1 * | 7/2019 | Jaskiewicz | F16K 15/036 | |
| 2020/0182368 A1 * | 6/2020 | Ostrowski | F16K 27/0209 | |
| 2020/0318743 A1 * | 10/2020 | Feng | F16K 1/222 | |
| 2020/0370678 A1 * | 11/2020 | Feng | F16K 47/023 | |

* cited by examiner

FLAPPER CHECK VALVE

CROSS REFERENCE TO RELATED APPLICATIONS

This application claims priority to European Patent Application No. 21461535.3 filed Apr. 27, 2021, the entire contents of which is incorporated herein by reference.

FIELD

The present disclosure relates to check valves, and in particular those used in aerospace such as aircraft check valves, which may be configured to vent pressurised air.

BACKGROUND

Check valves are valves that allow fluid flow in one direction therethrough and prevent flow in the opposite direction. They are widely used in a range of applications, for example, check valves may be used in an air distribution system to vent or control an amount of air that flows from one portion of an aircraft to another.

With reference to FIGS. 1A-C, a conventional check valve 1 includes a pair of flappers 2 located at an opening 4 in a valve housing 6. The flappers 2 are hingedly supported on a pin 8 mounted across (e.g. through the centre of) the opening 4 for rotation between an open position and a closed position. In the closed position they lie across and close the opening 4, preventing fluid flow through the opening 4. In the open position, and under the pressure of a fluid (gas or liquid) on one side of the check valve, the flappers 2 rotate from their closed position so as to allow the fluid to flow through the valve.

Ordinarily, as illustrated in FIGS. 1A-B, a cylindrical pin 10 is provided to limit the rotational movement of the flapper elements 2 as they open. Typically, the pin 10 is mounted in a pair of mounting posts 12 that extend upwardly from the valve housing 6 and space the pin 10 from the opening 4. Accordingly, when the flappers 2 open, they engage the stop pin 10 and are prevented from contacting each other. The stop pin 10 is typically quite narrow, its size being minimised so as to ensure a maximised open area when the flappers 2 are in the open position.

Thus, a very narrow contact area 14 is typically present between the cylindrical surface of the stop pin 10 and the surface of the flapper 2, and a high level of stress is experienced by both the stop pin 10 and flapper 2 in this contact area 14. This can lead to a gradual wear down 16 of either or both of the flapper 2 surface or cylindrical surface of the stop pin 10, resulting in a change in the performance of the check valve 1. The displacement of the flapper 2 relative to the stop pin 10 caused by this wear down 16 can also accelerate the wear of the associated hinge pin 8 to an unsatisfactory level, as illustrated in FIG. 1C.

Generally, flapper-type check valve 1 components are made of metallic materials. These metallic materials are relatively heavy, and may undesirably increase the weight of an aircraft when implemented therein. Additionally, metallic check valves may produce relatively loud noises during check valve operation (e.g. the opening and closing, or a fluttering of the flappers).

In a conventional check valve arrangement, as in U.S. Pat. No. 7,568,498B2, each flapper (or alternatively the stop pin) comprises an elastomeric protrusion configured to contact the stop pin (or flapper) when the flapper is in the open position. The elastomeric protrusions are provided to cushion contact between flappers and stop pin in order to minimise noise.

However, though such resilient arrangements may help to reduce unwanted noise, they present significant drawbacks as, for example, they do not serve to prevent the cause of the fluttering.

Further, such resilient arrangements allow the flappers to move against the resilient elements (e.g. a vibratory movement) when in the open position in response to, for example, fluctuations in forces created by high pressure, eddies or other turbulent flow regimes through the check valve.

This fluttering and/or vibratory movement can also contribute to the significant wear to the hinge pin 8 illustrated in FIG. 1C, and reduce the operational lifetime of the check valve 1.

The present disclosure aims to provide a check valve of this general construction, whilst having an improved stop arrangement that solves the above problems.

SUMMARY

In an aspect of the invention there is provided a check valve comprising a housing defining a pair of valve openings, a pair of flappers pivotably mounted to a pin and such that they are configured to rotate relative to the housing between an open position in which they permit fluid flow through the valve openings and a closed position in which they prevent fluid flow through the valve openings, and an element configured to stop and hold the flappers in the open position.

Each of the flappers comprise one or more surfaces configured to engage and contact static, opposing portions of the stop element and such that one or more openings are formed between each flapper and a respective stop element when the flappers are in the open position to ensure fluid is able to flow therebetween.

A cavity may be formed between the pair of flappers and stop element when the flappers are in the open position.

Each of the flappers may comprise one or more contact surfaces configured to contact the stop element when in the open position. The stop element may comprise a pair of stop surfaces comprising respective contact areas configured to oppose and abut the contact surfaces of the flappers when the flappers are in the open position. At least one of the contact surfaces of the flappers and contact areas of the stop element may be formed on one or more bumpers disposed on a respective one of the flappers and/or stop surfaces. One or more openings may be formed between each of the flappers and the stop element adjacent to the one or more bumpers when the flappers contact the stop element in the open position. Each of the contact areas of the stop elements may be configured to be conformal to the contact surface of a respective flapper when the flappers are in the open position.

The relatively large contact areas due to the provision of conformal contact surfaces allow for the even distribution of stress between the flappers and stop elements, for example, due to the percussive opening of the valve. This can greatly reduce the wear exhibited by these components locally (e.g. at the contact surface). The bumpers and the adjacent openings serve to facilitate smooth opening and closing of the valve by allowing the passage of air, thereby reducing fluttering and percussive opening events. This reduces wear on the contact surfaces associated with impact events between the contact surfaces, and vibrationary wear on the pin of the hinge. Further, the provision of a static stop element with contact surfaces configured to be stationary (e.g. non-resilient) can prevent positional fluctuations of the flapper when in the open position further reducing wear at the pin onto which the flappers are pivotly mounted (and, also locally on the contact surfaces). Moreover, a synergistic effect is provided by the provision of each of the conformal contact surfaces, the bumpers and associated openings, and stop element surfaces which are configured to remain stationary (rather than bend or flex in use). Indeed the aforementioned prevention of wear on the contact surface prevents wear on the pin, and the aforementioned prevention of wear on the pin prevents wear on the contact surfaces.

The contact surfaces on the flappers and the contact areas of the stop elements may be planar. In other words, and more generally the contact surfaces (34) of the flappers (30) and opposing portions of the stop element (42) are planar.

The pair of valve openings may define a plane. The stop element may comprise a strip of material. The strip of material may be oriented parallel to the plane. The use of a strip of material may increase the ease of manufacture and reduce the weight of the valve.

The strip of material may be substantially flat and may comprise a thickness selected such that a superficial contact width between the contact surfaces of the flappers and contact areas of the stop elements is equivalent. This matching of thicknesses allows for the minimisation of excess weight, which is particularly important when such valves are employed in the aviation industry.

The contact areas of the stop elements may be inclined relative to each other. In other words, the static, opposing portions of the stop element may define planar surfaces that converge towards each other in the direction of the valve openings. This facilitates easy tailoring of the conformal contact surfaces. For example, the contact surfaces of the flappers may be flat (i.e. parallel to a major surface of the flappers), and only the stop element may be tailored (e.g. cut or machined) to be conformal to the flappers. In this way the same flappers may be used on different check valves, for example, check valves configured for different fluids and which may require valves with different (smaller or larger) opening angles for smooth operation.

The stop element may comprise one or more apertures configured to allow the passage of fluid. These apertures, when provided, may further facilitate a reduction in fluttering, by facilitating the passage of fluid from the cavity.

The one or more bumpers may be configured to evenly distribute stress (e.g., evenly) around the flappers and/or distribute stress (e.g., evenly) along the pin.

Each of the flappers may comprise two or more knuckles configured to contact the pin. At least one of the one or more bumpers (or contact surfaces of the flapper) may be aligned to one of the knuckles. This allows for even distribution of stress through the pin.

The flappers and/or stop surfaces may be asymmetric relative to the pin such that, when in the open position, the openings of one of the flappers are offset from the openings of the other of the flappers. This can more evenly distribute fluid flow through the cavity and prevent high and low velocity regions of flow which can fluctuations in pressure and lead to valve fluttering.

The valve may comprise a pair of mounting posts for supporting the pin and/or the stop element. The mounting posts and the stop element may be formed of a single strip of material. This reduces manufacturing complexity and the overall mass of the valve.

Each flapper may comprise a length along which the one or more bumpers (or contact surfaces of the flapper) may extend in a direction substantially parallel to the pin. The one or more bumpers (or contact surfaces of the flapper) may extend across at least 20% of the length. The one or more bumpers (or contact surfaces of the flapper) may extend across at least 40% of the length. The provision of such relatively long bumpers, or with such large coverage can not only increase the contact surface area for stress distribution, but can also increase the area of the flapper around which the stress may be distributed. This again reduces wear on both the pin and the contact surfaces.

In another aspect of the invention there is provided a check valve comprising a housing defining a pair of valve openings, a pair of flappers pivotably mounted to a pin such that they are configured to rotate relative to the housing between an open position in which they permit fluid flow through the valve openings and a closed position in which they prevent fluid flow through the valve openings, a pair of mounting posts for supporting the pin, and an element configured to stop and hold the flappers in the open position. The mounting posts and stop element are formed from a single strip of material. The provision of a unitary mounting post and stop element arrangement greatly simplifies the manufacturing process and allows for rapid replacement and repair of the entire support and stop structure. It also allows the valve to be easily reconfigured (e.g. to modify the opening angle of the flappers). Further, the simple strip of material configuration drastically reduced the overall weight of the check valve.

Each of the flappers may comprise one or more contact surfaces configured to contact the stop element when in the open position. The stop element may comprise a pair of stop surfaces, comprising respective contact areas configured to oppose and abut the contact surfaces of the flappers when the flappers are in the open position. The contact areas may be configured to remain stationary. At least one of the contact surfaces of the flappers and contact areas may be formed on one or more bumpers disposed on a respective at least one of the flappers and stop surfaces. The provision of bumpers can facilitate a flow of fluid from a cavity formed between the bumpers and the stop element when the valve is in the open position, thereby preventing fluttering of the various valve elements.

The contact areas may be configured to be conformal to the contact surfaces of the flappers when the flappers are in the open position.

In another aspect a method of manufacturing a stop element is provided, the method comprising forming a stop element and a pair of mounting posts from a single flat piece of metal. This allows for simple mass manufacture of the valve elements, e.g. by machining, pressing or cutting multifaceted components of the valve.

The method may further comprise selecting a thickness of the flat piece of metal such that a superficial contact width between contact surfaces of the flappers and contact areas is equivalent. This minimises the weight of the valve.

BRIEF DESCRIPTION OF THE DRAWINGS

Various embodiments will now be described, by way of example only, and with reference to the accompanying drawings in which.

DETAILED DESCRIPTION

Figure 1A:
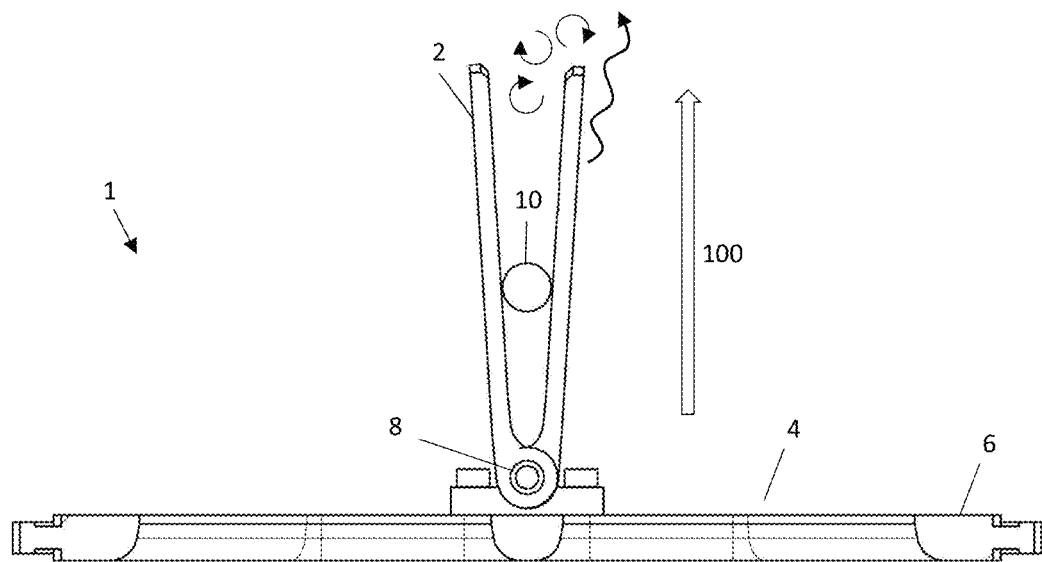
FIG. 1A shows a cross section of a known check valve in its open position, the check valve comprising pair of flappers, a stop pin and a hinge pin.

With reference to FIGS. 2-6, various embodiments of a check valve 20 in accordance with this disclosure are herewith described.

The check valve 20 comprises a housing 22. The valve housing 22 is a generally planar annular element which may be mounted in a pipe, duct or the like. The valve housing 22 comprises a pair of generally D-shaped valve openings 24 which are separated by a central web 26 of the valve housing 22.

A pair of mounting posts 40 extend upwardly from the valve housing 22. The mounting posts 40 may be integrally formed in place, for example cast, with the valve housing 22. Alternatively, the mounting posts 40 may be separately formed from the valve housing 22 and mounted thereto by suitable means, for example, welded thereto, or attached by bolts or other fasteners (not shown).

A pin 28 is mounted between the mounting posts 40 above the central web 26. The pin 28 may be a unitary structure, or may be constituted from two or more sections. The pin 28 may be mounted through pin apertures 48 in the mounting posts 40. Thus, the pin 28 may be installed in sections between mounting posts 40 already in place, or a unitary pin 28 may be installed, e.g., from one side through apertures 48 in the side of the posts. Alternatively, a pin 28 (e.g. a unitary pin) may be installed between the mounting posts before they are in place (i.e. before their mounting to the housing 22 as discussed below).

A stop element 42 (e.g. a rigid stop element) abridges the mounting posts 40, and is positioned above the pin 28.

A pair of generally D-shaped flappers 30 are pivotally mounted to the pin 28 and each flapper 30 interacts with a respective valve opening 24 to selectively close it. As is known in the art, the flappers 30 are pivotally mounted to the pin 28 by a hinge mechanism including respective mounting lugs or knuckles 29, and are pivotable between an open position and a closed position. In the closed position they close the valve openings 24, thereby preventing flow through the check valve, and in the open position the flappers 30 permit fluid to pass through the valve openings 24 in a flow direction 100 from a pressure side 110 of the valve 20 to a suction side 120 of the valve 20.

Figure 2:
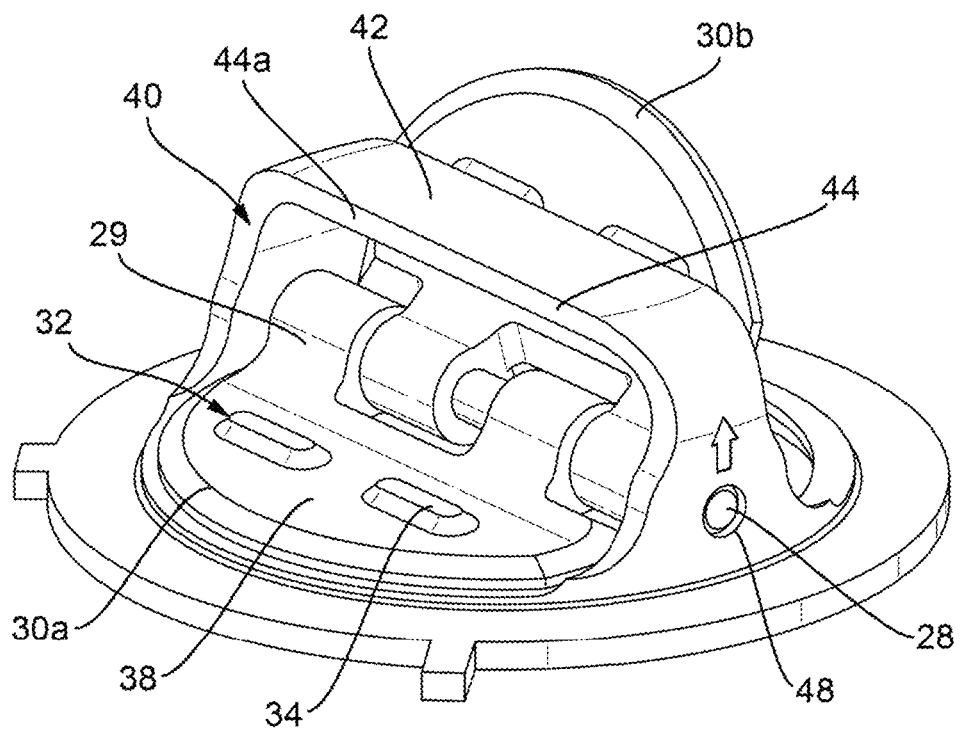
FIG. 2 shows a check valve in accordance with an embodiment of the invention wherein a flapper is in the open position, and another flapper is in the closed position.
Figure 3:
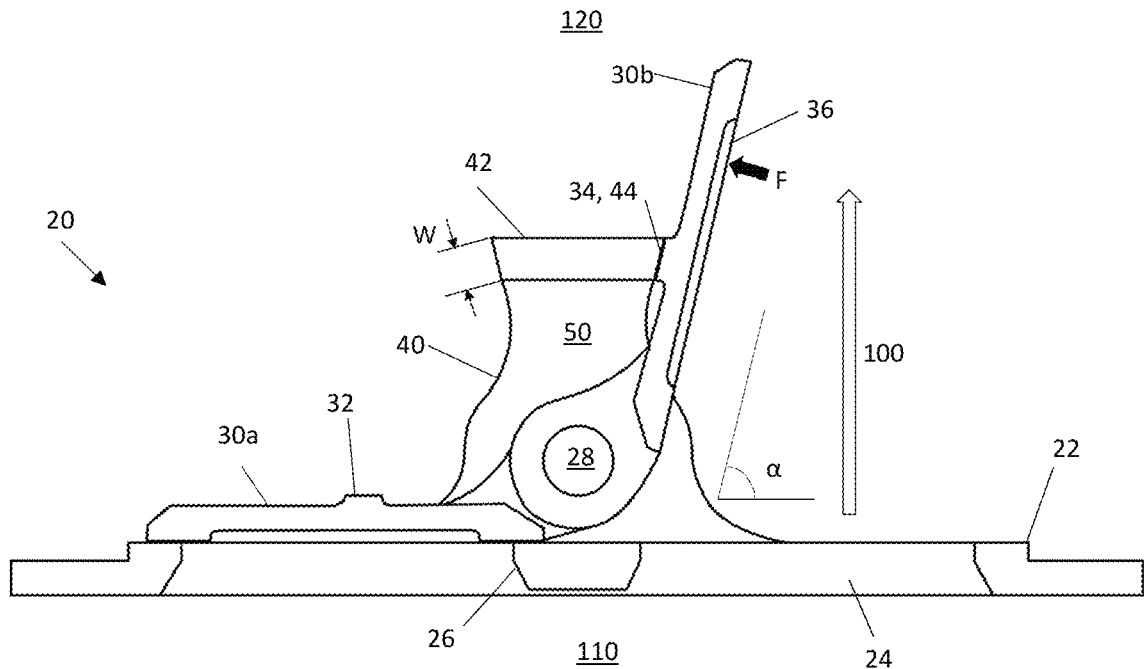
FIG. 3 shows a cross section of the check valve of FIG. 2.

FIGS. 2 and 3 show a check valve 20 wherein, for illustrative purposes to show both positions, one of the flappers 30a is disposed in the closed position, whilst the other flapper 30b is disposed in the open position. In the open position the flappers 30 engage the stop element 42 and define an opening angle α.

In normal operation, and when a pressure difference exists between the pressure side 110 and the suction side 120, a fluid exerts a force F on the flappers 30. This serves to move the flappers 30 from the closed position to the open position when the pressure difference exceeds a threshold pressure. The force is generally exerted on a flapper surface 36 (e.g. the pressure side surface). Thus, the magnitude of the force F on the flapper is reduced as the opening angle α is increased and the direction of fluid flow becomes more perpendicular to the surface 36.

In this context, and contrary to established principles for ensuring a maximised opening 24 area for maximised fluid flow 100, it has been found that a smaller opening angle α may reduce fluttering. This is because a larger force F is maintained against the flapper surface 36, relative to a smaller force which is present when a large opening angle α is employed.

Figure 1B:
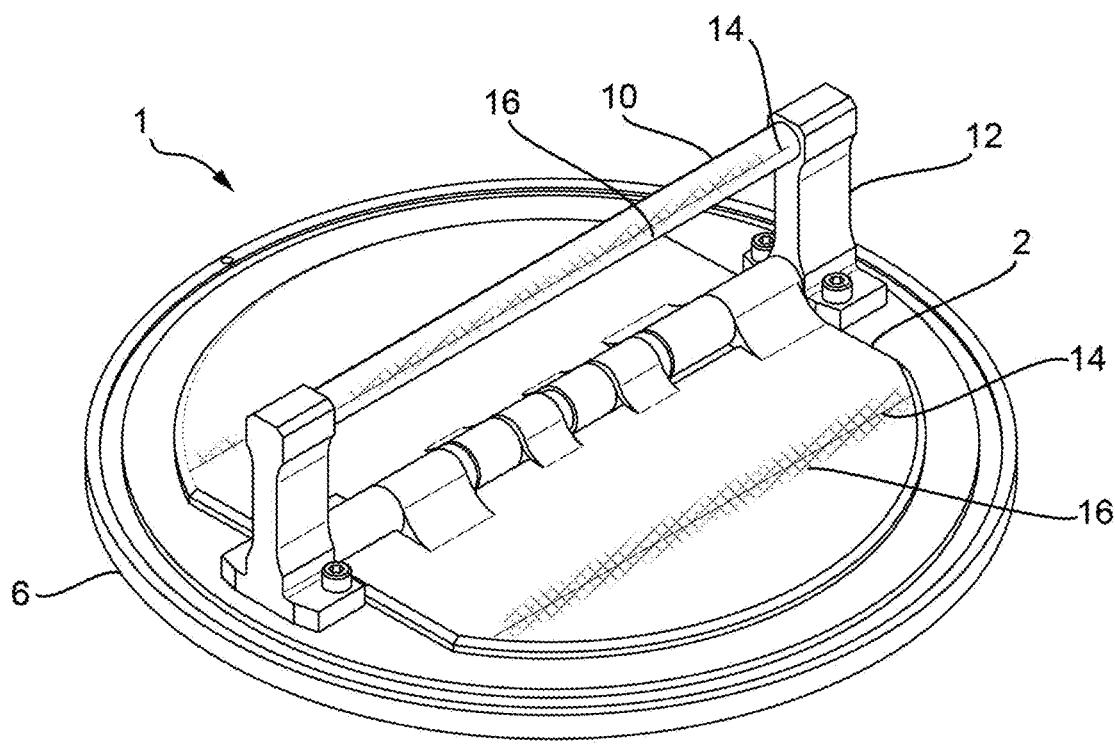
FIG. 1B shows regions of wear on the flapper and stop pin of the check valve of FIG. 1A.

However, maintaining a larger force F can also increase stress and associated wear (e.g., the wear down 16 of either or both of the flapper 2 surface or cylindrical surface of the stop pin 10 illustrated in FIG. 1B). Consequently, reducing fluttering in this way may lead to unintended knock-on effects which reduce the lifetime of the valve.

Advantageously, it has been found that a relatively large contact surface area 34, 44a between the flappers 30 and the stop element 42 may help to more evenly distribute stress across the flapper 30 and reduce wear on both the flapper 30 and the stop element 42. The even distribution of stresses and the reduction of wear of the flapper 30 and stop element 42 can also subsequently result in reduced stress and wear on the pin 28. It has therefore been found to be desirable to maximise the surface area of the contact surfaces between the flapper and stop element.

Figure 4:
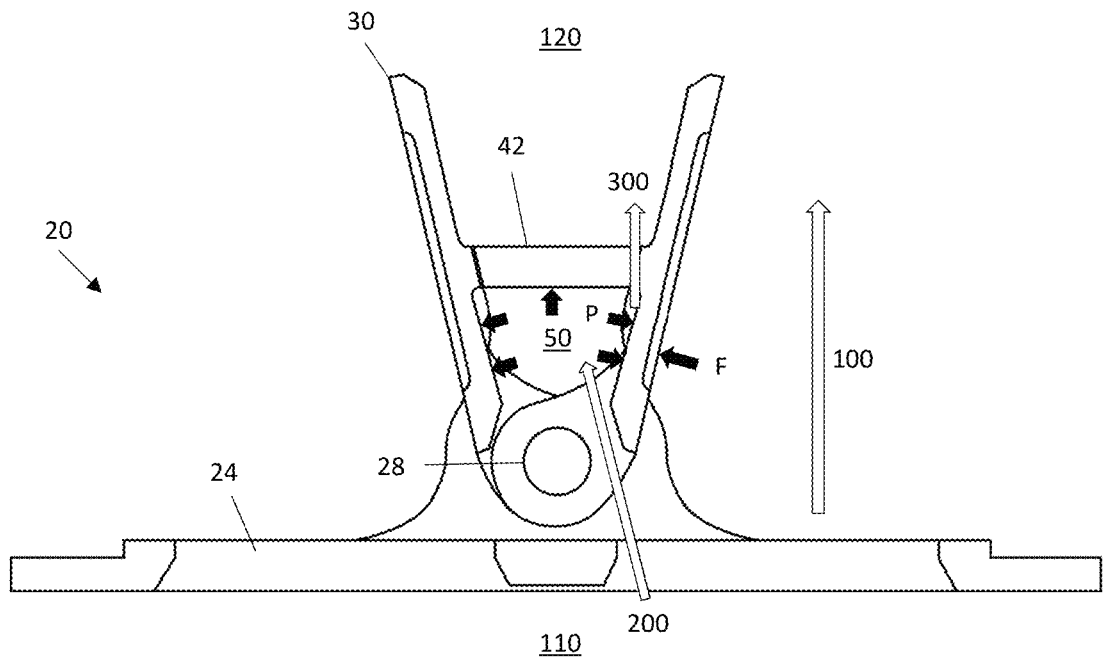
FIG. 4 shows a cross section of the check valve of FIG. 2 in the open position.

In accordance with embodiments, and with continued reference to FIGS. 2-4, the stop element 42 is shaped so as to present a surface 44 which is complementary or conformal to the flappers 30 in their open position. In embodiments the stop element 42 comprises a contact surface or area 44a which is conformal to the contact surface 34 of the respective flappers 30. For example, both the contact areas 44a on the stop element 42, and contact surfaces 34 on the flapper 30 may be flat (in contrast, for example, to established flat flapper and round stop pin arrangements). Either or both respective contact surfaces or areas 34, 44a may also be angled (e.g. inclined such that they are not parallel or perpendicular to a major surface thereof) in order to be complimentary to the angle of the other respective contact surface or area 34, 44a when the valve 20 is in the open position. In this way, the contact surface area between the flappers 30 and stop element 42 may be maximised.

With reference to FIG. 4, it has also been found that, during operation, a portion of fluid 200 may pass through the hinge mechanism (e.g. through gaps in the knuckles 29) and enter a cavity 50 formed between the flappers 30 and stop element 42 when in the open position. A build of pressure P resulting from this passage of fluid may oppose the force F from the fluid flow 100 and push the flappers 30 towards the closed position to allow the pressure build up to escape, thereby causing the flappers 30 to flutter.

Such fluttering can be present even in the absence of this passage of fluid (for example, when the hinge mechanism is sealed to prevent the passage of fluid to the cavity). With reference to FIG. 1A, it is believed that a high pressure fluid flow 100 through the valve opening 4 can cause local pressure fluctuations on the exposed surface of the flapper (e.g. the pressure side surface) which leads to the fluttering. Further, the fluid flow 100 over the tips of the flappers 2 can create eddies (turbulence) in the vacant space behind the flappers 2 (e.g. on the suction side) which, again, results in the fluttering of the flappers 2.

It has been found to be highly beneficial to provide clearances or openings 38 between the flappers 30 and the stop element 42 (when the flappers 30 are in the closed position), to not only allow the escape of fluid in the cavity 50, but to facilitate a fluid flow 300 therethrough such that the formation of eddies are prevented, thereby ensuring lower stress laminar flow regimes (see FIG. 4).

There are therefore potentially conflicting requirements for maximising the contact area 34 between the flappers 30 and stop element 42 whilst simultaneously facilitating a flow of fluid between the flappers 30 and stop element 42.

Figure 5:
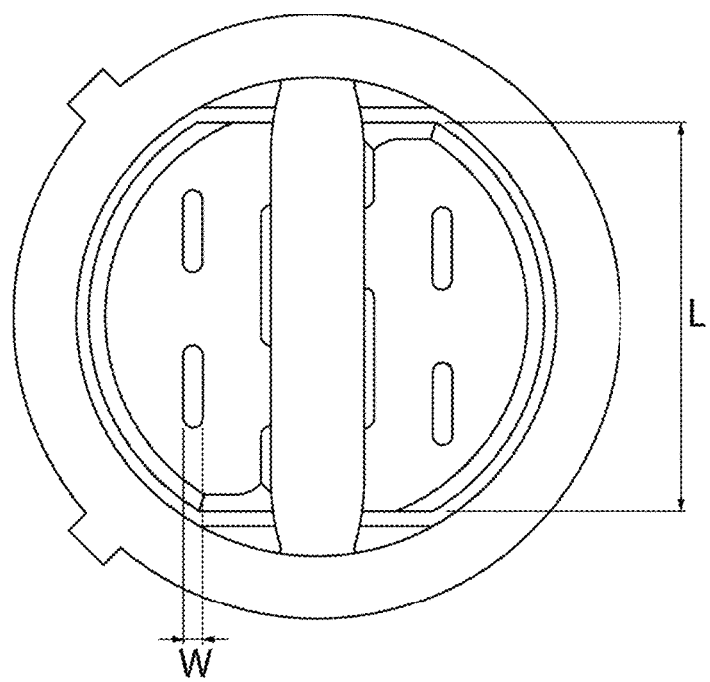
FIG. 5 shows a plan view of the check valve of FIG. 2 in the closed position.

In accordance with embodiments, and with reference to FIG. 5, it has been found beneficial to create a contact area 34 between each flapper 30 and the stop element 42 which extends across at least 20% of the length L of the flapper 30 (e.g. the superficial length L which would be in contact with the stop element 42 in the absence of any further surface features), whilst at the same time providing openings 38, clearances or vacancies along the same length L. The contact area between each flapper 30 and the stop element 42 may extend also across at least 40% of the length L of the flapper 30.

The contact area between flappers 30 and stop element 42 may be facilitated by one or more bumpers 32 (e.g. non-resilient or rigid bumpers which are substantially solid, hard, made of non-resilient materials and/or devoid of cushioning or resilient features, etc.) provided on either or both of the flappers 30 (see FIGS. 2-6). Additionally or alternatively, such bumpers may be provided on the stop element, e.g. on opposing lateral stop surfaces 44 thereof (not shown), such that the contact areas 44a of the stop element 42 are provided on the bumpers. The bumpers 32 may extend over a length L of the flapper (or a length of the stop element). In embodiments, the bumpers may cumulatively extend across at least 20% of the length L of the flapper 30 or across at least 40% of the length L of the flapper 30 or stop element 42.

In cases where bumpers are employed, the openings 38 may be provided between or adjacent to the bumpers 32. In these embodiments a height of the bumpers may be regulated so as to control the size of the openings 38.

Further, to ensure a maximised contact area (and optimise the weight of the check valve 20, as discussed below), a width W of each of the bumpers 32 may be controlled so as to match (and, thus, be complimentary to) a superficial contact width W of the stop element 42 (see FIGS. 3 and 5).

Figure 6:
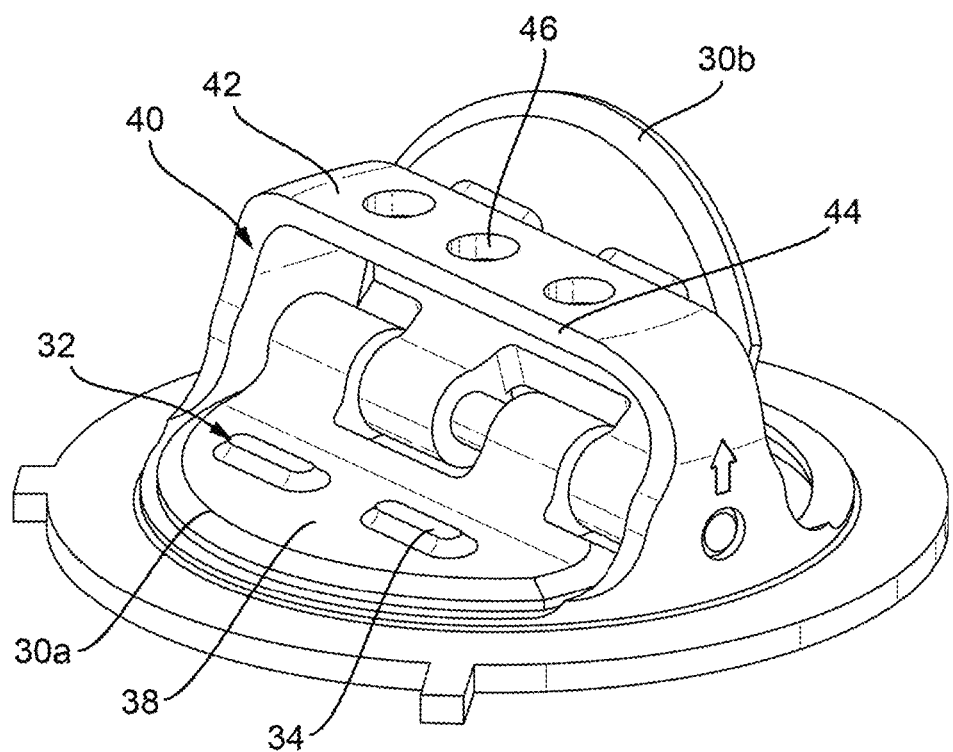
FIG. 6 shows a check valve in accordance with another embodiment of the invention.

With a view to further facilitating flow through the cavity 50, and in accordance with some embodiments, the stop element 42 itself may comprise openings or apertures 46 configured to allow the passage of air from the cavity 50 (see FIG. 6). Such apertures 46 may be provided in addition to, or as an alternative to, the previously described openings 38 between flapper and stop element.

In order to harmonise fluid flow through the cavity, it has been found to be beneficial to offset the bumpers 32 on one flapper 30 from the bumpers 32 on the other flapper 30. Accordingly, in embodiments, the bumpers 32 of the respective flappers are positioned asymmetrically to each other with respect to (on either side of) the centrally positioned pin 28 of the hinge mechanism.

With a view to more evenly distributing stresses along the pin 28, it has also been found to be beneficial to substantially align one or more of the bumpers 32 with the knuckles 29. Accordingly, in some embodiments, at least one bumper 32 of the one or more bumpers 32 on each flapper 30 is aligned with one of the knuckles 29 (i.e. aligned with respect to pin 28).

As discussed above, the opening angle α impacts the force F exerted on the flappers 30 in the open position. With a view to ensuring a more stable operation (e.g. to prevent fluttering and the associated wear), it is advantageous to limit the opening angle α in order to maintain a higher force F for steadily holding the flappers in the open position. For example, in some embodiments the opening angle α between the flappers 30 and the openings 24 may be less than 80 degrees. Limiting the opening angle may be achieved by providing a stop element with a larger separation between its sides.

However, the provision of ever larger stop pins (in the established cylindrical form) can exponentially increase the weight of the check valve as a whole. Such an increase in weight is highly undesirable, particularly in applications within the field of aerospace.

Thus, in embodiments, the stop element 42 is advantageously not cylindrical, or not substantially cylindrical in form. Instead the stop element 42 is provided as (comprises or consists of) a substantially flat, e.g. bar-shaped, strip of material. For example, the stop element 42 may comprise a rectangular, or trapezoid cross-section as it extends from one mounting post 40 to the other. In this form the breadth of the stop element 42 (i.e. the separation between opposing lateral sides 44 or contact areas 44a thereof) may be easily controlled without substantially affecting the overall mass of the check valve 20. Thus, the opening angle α of the check valve 20 may be optimised without adversely affecting the weight. The provision of the flat shape also allows thickness thereof to be more easily tailored. For example, the thickness of the stop element may be provided to as to exactly match a superficial contact thickness or width W of the bumpers 32. In this way the mass of the check valve may be minimised, and indeed reduced below current standards. Apertures 46, where provided, are easier to install and tailor as well.

Figure 1C:
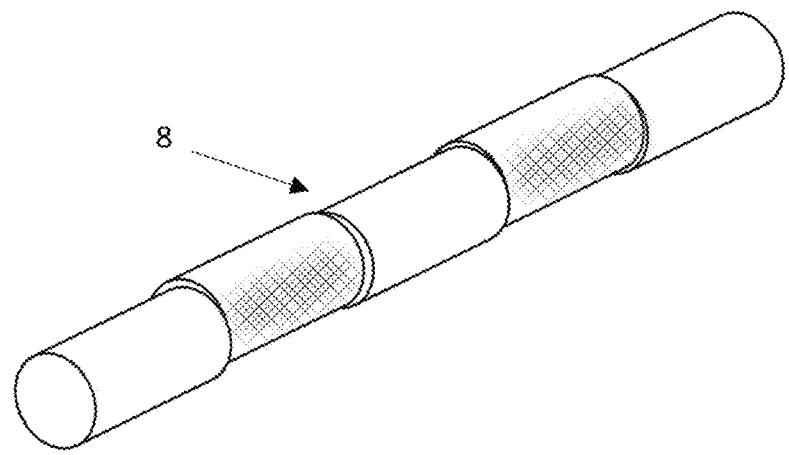
FIG. 1C shows the wear pattern of the hinge pin of the check valve of FIG. 1A after use.

Further, in embodiments, the stop element 42 is a non-resilient or rigid stop element 42 (i.e. substantially solid, hard, made of non-resilient materials and/or devoid of cushioning or resilient features, etc.). As such, the contact areas 44a of the stop element 42 may be configured to remain stationary, even when subject to the opening and closing or percussion of the flappers 30. Advantageously, the absence of any resilient or cushioning features (i.e. the provision of stationary stop contact surfaces or areas) helps to prevent vibratory movements in the flappers 30, thereby preventing increased wear on the pin of the hinge mechanism (see, for example, FIG. 1C).

The stop element 42 and the mounting posts 40 may also form a unitary or continuous bridge structure extending from one side of the housing 22 to the other (e.g. a single and/or continuous strip of material). In such embodiments the bridge structure may simultaneously perform the functions of supporting the pin 28, supporting the stop element 42 and serving as the stop element 42. The bridge structure may advantageously comprise a substantially uniform thickness along its entire build (i.e. the mounting posts 40, stop element 42 and any intervening sections may be substantially the same thickness and/or have substantially the same cross-section). The bridge structure may be formed of a single, bent piece of material of uniform thickness (e.g. sheet metal) which is shaped to form the mounting posts 40, the stop element 42, and/or pin apertures 48 for supporting the pin 28. Alternatively, the bridge structure may be cast, either independently, or integrally to the housing 22. In cases of bridge structure being formed separate from the housing, the bridge structure may be deformed along its axis to facilitate installation of the pin 28 (e.g. a unitary hinge pin) between the mounting posts 40. The bridge structure and pin may then be mounted to the housing 22 by the mounting posts 40 thereof by any suitable means (as discussed above).

Regardless of how the bridge structure is formed (e.g. from a sheet of metal, or by casting, separately or as part of the housing 22), the simplified design thereof (e.g. its substantially uniform thickness and/or its continuous design) may significantly improve the ease of its manufacture (e.g. by being stamped from sheet metal, or by greatly reducing the complexity of a mould needed for casting).

Although the present disclosure has been described with reference to various embodiments, it will be understood by those skilled in the art that various changes in form and detail may be made without departing from the scope of the invention as set forth in the accompanying claims.

The invention claimed is:

1. A check valve comprising:
a housing defining a pair of valve openings;
a pair of flappers pivotably mounted to a pin, each of the pair of flappers being pivotable between an open position in which they permit fluid flow through the pair of valve openings and a closed position in which they prevent fluid flow through the pair of valve openings, wherein each of the pair of flappers comprise one or more bumpers defining one or more contact surfaces, wherein the one or more contact surfaces are planar;
a stop element positioned such that the stop element contacts the one or more contact surfaces when in the open position; and
a pair of mounting posts supporting the pin and the stop element;
wherein one or more openings are formed between each of the pair of flappers and the stop element when in the open position;
wherein the stop element defines a respective stop surface for each of the one or more contact surfaces, wherein the respective stop surfaces are planar, wherein the respective stop surfaces of the stop element are positioned such that the respective stop surfaces oppose and abut the one or more contact surfaces when in the open position; and
wherein the respective stop surfaces of the stop element are parallel to the one or more contact surfaces of each of the pair of flappers when in the open position;
wherein the stop element comprises a flat bar-shaped strip of material extending between the pair of mounting posts, the flat bar-shaped strip of material being devoid of any apertures.

2. A check valve as claimed in claim 1, wherein the pair of valve openings define a plane, and wherein the flat bar-shaped strip of material devoid of apertures is oriented parallel to the plane, wherein the flat bar-shaped strip of material devoid of apertures comprises a thickness selected such that a width (W) of the one or more contact surfaces and a width of the respective stop surfaces of the stop element is equivalent.

3. A check valve as claimed in claim 1, wherein the one or more contact surfaces and the respective stop surfaces of the stop element are planar.

4. A check valve as claimed in claim 1, wherein the respective stop surfaces of the stop element are planar surfaces that converge towards each other in the direction of the valve openings.

5. A check valve as claimed in claim 1, wherein each of the pair of flappers comprise two or more knuckles contacting the pin, and wherein at least one of the one or more contact surfaces is parallel and adjacent to one of said knuckles.

6. A check valve as claimed in claim 1, wherein the pair of flappers are asymmetric relative to the pin such that, when in the open position, openings of one of the pair of flappers are offset from any openings of the other of the pair of flappers.

7. A check valve as claimed in claim 1, wherein the mounting posts and the stop element are formed of a single strip of material.

8. A check valve as claimed in claim 1, wherein each of the pair of flappers comprises a length (L) along which the one or more contact surfaces formed on the one or more bumpers extend parallel to the pin, the one or more contact surfaces formed on the one or more bumpers extending across at least 20% of the length (L).

9. A method of manufacturing a check valve as claimed in claim 1, the method comprising:
forming the stop element and the pair of mounting posts as a monolithic structure cut from a single flat piece of metal; and
selecting a thickness of the flat piece of metal such that a width (W) of the one or more contact surfaces and a width of the respective stop surfaces is equivalent.

10. A check valve as claimed in claim 1, wherein the stop element comprises a rectangular or trapezoid cross-section as the stop element extends between the pair of mounting posts.

11. A check valve comprising:
a housing defining a pair of valve openings;
a pair of flappers pivotably mounted to a pin, each of the pair of flappers being pivotable between an open position in which they permit fluid flow through the pair of valve openings and a closed position in which they prevent fluid flow through the pair of valve openings, wherein each of the pair of flappers comprise one or more bumpers defining one or more contact surfaces, wherein the one or more contact surfaces are planar;
a stop element positioned such that the stop element contacts the one or more contact surfaces when in the open position; and
a pair of mounting posts supporting the pin and the stop element;
wherein one or more openings are formed between each of the pair of flappers and the stop element when in the open position;
wherein the stop element defines a respective stop surface for each of the one or more contact surfaces, wherein the respective stop surfaces are planar, wherein the respective stop surfaces of the stop element are positioned such that the respective stop surfaces oppose and abut the one or more contact surfaces when in the open position; and
wherein the respective stop surfaces of the stop element are parallel to the one or more contact surfaces of each of the pair of flappers when in the open position;
wherein the stop element comprises a flat bar-shaped strip of material extending between the pair of mounting posts, the flat bar-shaped strip of material including one or more apertures.

* * * * *